US009018591B2

(12) United States Patent
Herr et al.

(10) Patent No.: US 9,018,591 B2
(45) Date of Patent: Apr. 28, 2015

(54) RUGGEDIZED TOOL AND DETECTOR DEVICE

(75) Inventors: Daniel J. Herr, Twinsburg, OH (US); John H. Frank, Hartville, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 865 days.

(21) Appl. No.: 13/211,383

(22) Filed: Aug. 17, 2011

(65) Prior Publication Data

US 2012/0043458 A1    Feb. 23, 2012

Related U.S. Application Data

(60) Provisional application No. 61/374,399, filed on Aug. 17, 2010.

(51) Int. Cl.
*G01T 1/20* (2006.01)

(52) U.S. Cl.
CPC .................................. *G01T 1/20* (2013.01)

(58) Field of Classification Search
CPC ......... G01N 21/64; G01V 8/00; G01V 8/005; G01V 8/02; G01V 8/10; G01V 8/12; G01V 8/14; G01V 8/16; H01J 40/14; G01T 1/20; G01T 1/2018; G01T 1/2026; G01T 1/243; G01T 1/244
USPC .................... 250/239, 300, 370.11, 254, 256, 250/261–262, 269.1; 73/152.07; 175/41
See application file for complete search history.

(56) References Cited

U.S. PATENT DOCUMENTS

| | | | |
|---|---|---|---|
| 4,131,160 A * | 12/1978 | Cochran | 166/120 |
| 4,158,773 A | 6/1979 | Novak | |
| 4,383,175 A | 5/1983 | Toepke | |
| 4,727,592 A | 2/1988 | Okada et al. | |
| 4,764,677 A | 8/1988 | Spurney | |
| 4,829,185 A | 5/1989 | Cerff | |
| 4,994,673 A | 2/1991 | Perna et al. | |
| 5,047,635 A | 9/1991 | Leaney et al. | |
| 5,087,818 A | 2/1992 | Bellian et al. | |
| 5,103,099 A | 4/1992 | Bourdinaud et al. | |

(Continued)

FOREIGN PATENT DOCUMENTS

| | | |
|---|---|---|
| EP | 0402035 A1 | 12/1990 |
| JP | 2000-300546 A | 10/2000 |

(Continued)

OTHER PUBLICATIONS

GE Energy, Scinturion* Gamma Modules for Ryan Energy MWD Systems, Case Study, www.ge-energy.com/oilfield; Dec. 2008, 2 pages.

(Continued)

*Primary Examiner* — Georgia Y Epps
*Assistant Examiner* — Kevin Wyatt
(74) *Attorney, Agent, or Firm* — Abel Law Group, LLP; Robert N. Young

(57) ABSTRACT

A tool comprising a tool body having an opening defined by interior walls extending into the tool body and a casing disposed within the opening. The tool further includes a scintillator material disposed within the casing and a first compressive member disposed within the tool body at a first axial location. The first axial location extends for a fraction of a total axial length of the casing and exerts a first radially compressive force at the first axial location.

20 Claims, 7 Drawing Sheets

(56) References Cited

U.S. PATENT DOCUMENTS

| | | |
|---|---|---|
| 5,120,963 A | 6/1992 | Robinson et al. |
| 5,283,439 A | 2/1994 | Bouissou et al. |
| 5,548,116 A | 8/1996 | Pandelisev |
| 5,636,299 A | 6/1997 | Bueno et al. |
| 5,684,907 A | 11/1997 | Sprehn et al. |
| 5,742,057 A | 4/1998 | Frederick et al. |
| 5,783,829 A | 7/1998 | Sealock et al. |
| 5,796,109 A | 8/1998 | Frederick et al. |
| 5,869,836 A | 2/1999 | Linden et al. |
| 5,962,855 A | 10/1999 | Frederick et al. |
| 6,078,052 A | 6/2000 | DiFilippo |
| 6,355,932 B1 | 3/2002 | Frederick |
| 6,465,788 B1 | 10/2002 | Medley |
| 7,034,305 B2 | 4/2006 | Frederick et al. |
| 7,154,098 B2 | 12/2006 | Clarke et al. |
| 7,170,061 B2 | 1/2007 | Clarke et al. |
| 7,189,972 B2 | 3/2007 | Ertel et al. |
| 7,326,933 B2 | 2/2008 | Katagiri et al. |
| 7,573,035 B2 | 8/2009 | Levene et al. |
| 7,828,068 B2 * | 11/2010 | Gano et al. .................. 166/387 |
| 2002/0113352 A1 | 8/2002 | Edwards |
| 2008/0093557 A1 | 4/2008 | Cooke et al. |
| 2009/0014662 A1 | 1/2009 | Suhami |
| 2009/0020705 A1 | 1/2009 | Pandelisev |
| 2009/0261263 A1 | 10/2009 | Menge et al. |
| 2010/0032577 A1 * | 2/2010 | Fruehauf et al. ............. 250/368 |
| 2010/0193690 A1 | 8/2010 | Hunt |
| 2010/0224783 A1 | 9/2010 | Frank |
| 2010/0243877 A1 * | 9/2010 | Berheide et al. ........... 250/252.1 |
| 2010/0294415 A1 | 11/2010 | Frank |
| 2011/0079726 A1 | 4/2011 | Kusner et al. |
| 2011/0121187 A1 * | 5/2011 | Frank ........................... 250/368 |
| 2011/0309257 A1 | 12/2011 | Menge |

FOREIGN PATENT DOCUMENTS

| | | |
|---|---|---|
| WO | 2011159911 A2 | 12/2011 |
| WO | 2012024359 A2 | 2/2012 |

OTHER PUBLICATIONS

The International Search Report and the Written Opinion for International Application No. PCT/US2011/048023 received from the International Searching Authority (ISA/KR), dated Mar. 14, 2012, 10 pages.

Andrew C. Stephan et al., "Neutronics aspects of position-sensitive neutron scintillator detectors using wavelength-shifting readout fibers," Applied Radiation and Isotopes 61 (Apr. 2004) pp. 1375-1382.

Donald P. Hutchinson et al., "Position Sensitive Scintillation Neutron Detectors using a Crossed-Fiber Optic Readout Array," SPIE, Proceedings vol. 3769, Oct. 1, 1999, 4 pages.

International Search Report for PCT/US2011/040719 dated Feb. 20, 2012, 3 pgs.

U.S. Appl. No. 13/162,292, filed Jun. 16, 2011, Inventors: Peter R. Menge.

U.S. Appl. No. 61/356,352, filed Jun. 18, 2010, Inventors: Peter R. Menge.

* cited by examiner

RUGGEDIZED TOOL AND DETECTOR DEVICE

CROSS-REFERENCE TO RELATED APPLICATION(S)

The present application claims priority from U.S. Provisional Patent Application No. 61/374,399, filed Aug. 17, 2010, entitled "Ruggedized Tool and Detector Device," naming inventors Daniel J. Herr et al., which application is incorporated by reference herein in its entirety.

BACKGROUND

1. Field of the Disclosure

The present disclosure is directed to detectors, particularly ruggedized scintillator devices for industrial applications.

2. Description of the Related Art

Scintillation detectors have been employed in various industrial applications, such as the oil and gas industry for well logging. Typically, these detectors have scintillator crystals made of certain materials effective for detecting various types of radiation, including for example, gamma rays. Generally, the scintillator crystals are enclosed in tubes or casings, which include a window permitting radiation induced scintillation light to pass out of the crystal package for measurement by a light-sensing device such as a photomultiplier tube. The photomultiplier tube converts the light photons emitted from the crystal into electrical pulses that are shaped and digitized by associated electronics that may be registered as counts and transmitted to analyzing equipment. In terms of well logging applications, the ability to detect gamma rays makes it possible to analyze rock strata as gamma rays are emitted from naturally occurring radioisotopes, typically of shales that surround hydrocarbon reservoirs. Today, a common practice is to make measurements while drilling (MWD). For MWD applications, the detector should be ruggedized, that is, it should have a high shock resistance and be capable of withstanding relatively high temperatures, while maintaining performance specifications for a reasonable lifetime.

In certain cases the detector may report a higher than an actual count rate if the scintillation device detects false counts due to vibrations (i.e., vibration-induced counts). Therefore, falsely high readings may occur due to the fact that the detector output will be composed of radiation-induced counts and vibration-induced counts. Moreover, the issue can be exaggerated when detecting low-level radiation events while the detector is subject to a severe operational environment, such as drilling.

Accordingly, the industry continues to need improvements in scintillator devices, particularly ruggedized scintillator devices that can withstand the harsh environments of industrial applications.

SUMMARY

In a first aspect, a tool includes a tool body having an opening defined by interior walls extending into the tool body, a casing disposed within the opening, a scintillator material disposed within the casing, and a first compressive member disposed between the casing and the tool body at a first axial location. The first axial location extends for a fraction of a total axial length of the casing and the first compressive member exerts a first radially compressive force at the first axial location.

In another aspect, a detector includes a detector housing, a scintillator material disposed within the detector housing, and a first compressive member disposed between the detector housing and the scintillator material at a first axial location, wherein the first axial location extends for a fraction of a total axial length of the detector housing and a fraction of a total axial length of the scintillator material. The first compressive member exerts a first compressive force around an entire peripheral side surface of the scintillator material at the first axial location.

One aspect of the present application is directed to a detector including a photosensor housing, a photosensor disposed within the photosensor housing, and a first compressive member disposed between the photosensor housing and the photosensor at a first axial location. The first axial location extends for a fraction of a total axial length of the photosensor housing and a fraction of a total axial length of the photosensor. The first compressive member exerts a first compressive force around an entire peripheral side surface of the photosensor at the first axial location.

According to another aspect, a detector including a detector housing, a scintillator material disposed within the detector housing, and a first compressive member having a coiled construction and disposed between the detector housing and the scintillator material, wherein the first compressive member exerts a first radially compressive force around a peripheral side surface of the scintillator material.

In yet another aspect, a detector includes a detector housing, a scintillator material disposed within the detector housing, and a first compressive member disposed between the detector housing and the scintillator material. The first compressive member comprises a helically-shape body including a plurality of turns connected to each other and wrapping around a peripheral side surface of the scintillator material.

According to still another aspect, a detector comprising a detector housing, a scintillator material disposed within the detector housing, and a first compressive member disposed between the detector housing and the scintillator material at a first axial location occupying a fraction of a total length of the detector housing and a fraction of the total length of the scintillator material, wherein the first compressive member is disposed within a recess at the first axial location.

In another aspect, a detector comprising a detector housing, a scintillator material disposed within the detector housing, a first compressive member disposed between the detector housing and the scintillator material at a first axial location, a second compressive member disposed between the detector housing and the scintillator material at a second axial location axially spaced apart from the first axial location along a length of the scintillator material, and a spacer disposed between the first and second compressive members.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description is directed to radiation detection devices, and particularly, ruggedized assemblies of detector devices for use within tools. For example, the detector devices of embodiments herein may be used in downhole exploration and logging, and particularly, may be attached to drill strings for measure while drilling (MWD) applications.

The description discloses use of ruggedized assemblies utilizing particular combination of elements, including for example, compression members that can engage a casing. As used herein, a casing can refer to different structures depending upon the particular embodiment. For example, the casing can be the detector housing, which includes within the interior, elements such as a scintillator crystal, reflector, and the like. In other embodiments, the casing can be a photosensor housing, which includes within the interior elements such as the photosensor and associated components, including for example, signal processing components. Alternatively, the casing can include an outer housing which is designed to house the entire radiation detector, including a photosensor, light pipe, and a detector housing. The larger outer housing is typically shaped and sized to fit within an opening of a tool body. Various features of each embodiment are described in more detail herein.

According to a one aspect, a radiation detector device is disclosed that includes a scintillator material. The scintillator material can be sensitive to particular types of radiation, for example, gamma rays, such that when the material is struck by a particular type of radiation, the scintillator responds by fluorescing or scintillating electromagnetic radiation at a known wavelength. The fluoresced radiation can be captured and recorded by a photosensor, such as a photomultiplier tube, which converts the fluoresced radiation to an electrical signal for processing. As such, the detector can provide a user with the ability to detect and record radiation events, which in the context of MWD applications, may enable users to determine the composition rock strata surrounding a borehole.

Figure 1:
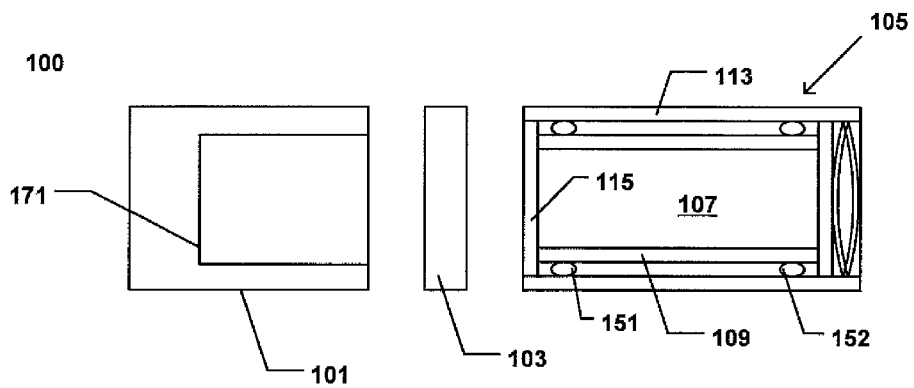
FIG. 1 includes a diagram of a radiation detector in accordance with an embodiment.

FIG. 1 illustrates a radiation detector according to one embodiment. As illustrated, the radiation detector 100 includes a photosensor 171, a detector assembly 105, and a light pipe 103, disposed between the photosensor 171 and the detector assembly 105. The detector assembly 105 can include a scintillator material 107 disposed within and substantially surrounded by a reflector 109. The scintillator material 107 and reflector 109 can disposed within a central cavity of a detector housing 113.

In further reference to FIG. 1, the photosensor 171 can be a device capable of spectral detection and resolution, such as a photomultiplier tube or other detection device. The scintillated radiation in the form of photons can be emitted from the scintillator material upon detection of a particular type of radiation that can be transmitted through the window 115 of the scintillator assembly 105, through the light pipe 103, to the photosensor 171. As is understood in the art, the photosensor 171 can provide a count of the photons detected, which provides data on the radiation detected by the scintillator material 107.

The photosensor 171 can be housed within a casing, which may be particularly referred to as a photosensor housing 101, which can include a material capable of protecting the electronics of the photosensor 171, such as a metal, metal alloy or the like. Various structures and materials can be provided within the photosensor housing 101 to stabilize the detection device during use and ensure good optical coupling between the light pipe 103 and the scintillator assembly 105, including any of the features of the embodiments herein.

As illustrated, the light pipe 103 is disposed between the photosensor 171 and the scintillator assembly 105. The light pipe 103 can facilitate optical coupling between the photosensor 171 and the scintillator assembly 105 and can be coupled to the scintillator assembly 105 and the photosensor 171 using various suitable mechanism to ensure proper optical coupling.

The detector housing 113 can be a sealed vessel having an atmosphere that is sealed from, and different than, the ambient atmosphere. The atmosphere within the detector housing 113 can be a non-oxidizing atmosphere, such as an inert atmosphere including an inert gas, for example, a noble gas, nitrogen or a combination thereof. In particular instances, the atmosphere within the detector housing 113 can comprise not greater than about 50 ppm oxygen or even not greater than about 25 ppm. Moreover, certain scintillator materials 107 may be hygroscopic materials, and accordingly the amount of water vapor within the atmosphere can be controlled such that the water content within the scintillator assembly 105 is not greater than about 20 ppm.

It should be noted that the detector designs of the embodiments herein can be particularly suited for detectors intended to encounter high temperatures. The detector designs of embodiments herein can withstand temperatures in excess of 150° C., and particularly in excess of 200° C., and incorporate a combination of components and design features associated with such components to enable use of the detector in high temperature environments.

FIG. 1 further includes compressive members 151 and 152 disposed between the detector housing 113 and the scintillator material 107. In particular, the compressive members 151 and 152 may be disposed between and abutting the surfaces of the detector housing 113 and reflector 109. The compressive members 151 and 152 can be situated within the detector housing 113 such that they are configured to buttress the scintillator material 107 within the detector housing 113 and absorb shocks delivered to the detector housing 113.

Figure 2A:
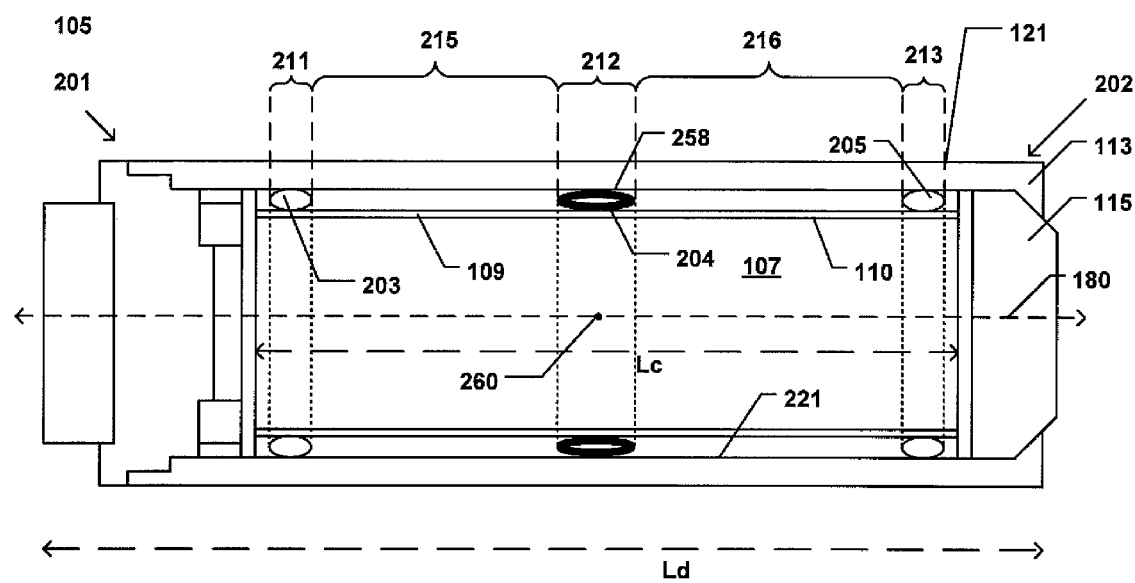
FIG. 2A includes a cross-sectional illustration of a detector in accordance with an embodiment.

FIG. 2A includes a cross-sectional illustration of a portion of the detector 105 in accordance with an embodiment. As illustrated, the detector 105 can include a casing, or more particularly, a detector housing 113 having a distal end 201 incorporating components to seal the detector housing 113 and a proximal end 202 incorporating the window 115. As illustrated in FIG. 2A, the scintillator material 107 can be disposed within the detector housing 113, and further can include a reflector 109 disposed around the peripheral side surface 110 of the scintillator material 107.

In accordance with an embodiment, the scintillator material 107 can be a material selected from the group of materials including inorganic materials, organic materials, and a combination thereof. In more particular instances, the scintillator material may be formed of inorganic materials including for example halides, oxides, and a combination thereof. In one particular instance, the scintillator material 107 can be a crystalline, inorganic material. In fact, certain crystalline, inorganic materials can include rare-earth elements. Moreover, such inorganic materials may have a hexagonal crystal structure.

Embodiments herein may utilize a detector incorporating a scintillator material 107 made of a crystalline inorganic material, such as CsF, NaI, LaCl$_3$, LaBr$_3$, BGO (e.g., Bi$_4$Ge$_3$O$_{12}$), CaF$_2$, LYSO (e.g., Lu$_{1.8}$Y$_{0.2}$SiO$_5$), LSO (e.g., Lu$_2$SiO$_5$), CsI, LuI$_3$, GSO (e.g., Gd$_2$SiO$_5$), CLYC (e.g., Cs$_2$LiYCl$_6$), CNLI (e.g., Cs$_2$NaLaI$_6$), CLLB (e.g., Cs$_2$LiLaBr$_6$), LuAO (e.g., LuAlO$_3$), LuYAO (e.g., Lu$_x$Y$_{1-x}$AlO$_3$), LuAO (e.g., Lu$_3$Al$_5$O$_{12}$), Lu$_2$Si$_2$O$_7$, GdI$_3$, SrI$_2$, LGSO (e.g., Lu$_{1.8}$Gd$_{0.2}$SiO$_5$) GYSO (e.g., GdYSiO$_5$), LGYSO and combinations thereof. It will be appreciated, that the foregoing crystalline, inorganic materials can include dopants, which may be present as elemental species in minor amounts within the compound.

In other embodiments, the scintillator material may include an organic material. For example, suitable organic materials may include polymer materials. In certain instances, the scintillator material 107 may incorporate a combination of inorganic and organic materials, such as any of the organic materials utilized above in combination with a polymer material.

Figure 2B:
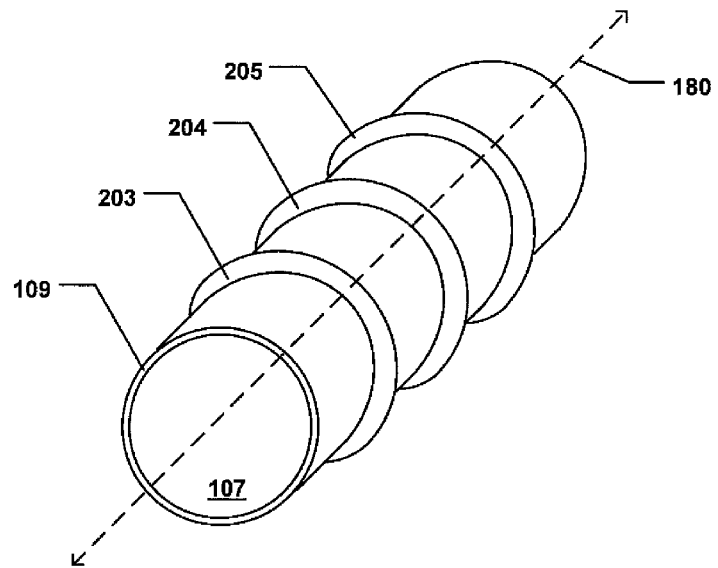
FIG. 2B includes a perspective view illustration of a portion of a detector in accordance with an embodiment.

Referring briefly to FIG. 2B, a perspective view illustration of a scintillator material 107 is illustrated in accordance with an embodiment. As illustrated, the scintillator material 107 can be shaped, in certain circumstances, to have a cylindrical shape and having a length extending along a longitudinal axis 180 between a first end and second end of the scintillator material 107. As will be appreciated, and referring again to FIG. 2A the scintillator material 107 can have a length (Lc) extending along the length of the longitudinal axis 180.

Likewise, the detector housing 113 can have a length (Ld) extending along the longitudinal axis 180. It should be noted herein that reference will be made to particular components within the detector housing 113 and the longitudinal axis 180 defines an axial direction and directions substantially perpendicular to the longitudinal axis 180 can define radial directions relative to the scintillator material 107.

The reflector 109 can be disposed around the peripheral side surface 110 of the scintillator material 107. In one embodiment, the reflector 109 can be substantially surrounded by a liner (not illustrated) disposed around the outer surface of the reflector 109, which can include a metal material, particularly a thin metal liner such as a foil. In accordance with a particular embodiment, the coating material can include aluminum foil. In other embodiments, the reflector 109 can consist essentially of the liner, such that the reflector is a thin metal foil.

In accordance with a particular embodiment, the reflector 109 can be a preformed sheet containing a polymer material. Some suitable polymer materials can include fluorinated polymers. In one embodiment, the fluorinated polymer can include a fluorine substituted olefin polymer comprising at least one monomer selected from the group consisting of vinylidene fluoride, vinylfluoride, tetrafluoroethylene, hexafluoropropylene, trifluoroethylene, chlorotrifluoroethylene, ethylene-chlorotrifluoroethylene, and mixtures of such fluoropolymers. In one particular embodiment, the reflector 109 consists essentially of a fluorinated polymer. In a more particular embodiment, the reflector 109 is made essentially of polytetrafluoroethylene (PTFE).

As illustrated in FIG. 2A, the detector assembly 105 can include a compressive member 203 disposed within the detector housing 113 and between the inner surface 221 of the detector housing 113 and the scintillator material 107. In particular, the compressive member 203 can be in a compressed state and abutting the inner surface 221 of the detector housing 113 and the reflector 109 disposed peripherally around the side surface 110 of the scintillator material 107. As noted herein, the compressive member 203 can be disposed within the detector housing 113 to absorb shocks to the detector housing 113, thus protecting the scintillator material 107 from damage. As illustrated, the compressive member 203 can extend around the entire peripheral side surface 110 of the scintillator material 107. In certain designs, the compressive member 203 can have an annular shape, defining a central opening, through which a portion of the scintillator material is disposed. The compressive member 203 occupies an axial position 211 which extends axially for a fraction of the total length (Lc) of the scintillator material 107 along the longitudinal axis 180.

The compressive member 203 can exert a compressive force, particularly a radially compressive force, on the scintillator material 107 around the entire peripheral side surface 110 of the scintillator material 107 at the axial location 211 where the compressive member 203 is disposed.

Referring briefly to FIG. 2B, a perspective view illustration of the compressive member 203 is provided. As illustrated, the compressive member 203 (as well as compressive members 204 and 205) can extend around (i.e. circumferentially) the scintillator material 107 at a particular axial location. The term circumferentially as used herein is understood to reference a direction around a periphery of an object about the longitudinal axis 180, typically the scintillator material, and the term is understood to denote the same placement and direction independent of the cross-sectional shape of the article being referenced.

The compressive member 203 can be formed of an organic material, an inorganic material, and a combination thereof. In certain instances, the compressive member 203 can incorporate can metal or metal alloy material. In particular, the compressive member 203 may be formed of at least one transition metal element and may be formed of an alloy of many transition metal elements. Further characteristics of the compressive members used in embodiments herein will be provided in more detail.

FIG. 2A further illustrates a compressive member 204 disposed between the detector housing 113 and the scintillator material 107 at an axial location 212. As illustrated, the compressive member 204 can extend around the peripheral side surface 110 of the scintillator material 107, and particularly, abutting the reflector 109 and the inner side surface 221 of the detector housing 113. The compressive member 204 can occupy an axial location 212 which has a width that extends for a fraction of the total length (Lc) of the scintillator material 107 as measured along the longitudinal axis 180. Like the compressive member 203, the compressive member 204 can exert a compressive force, particularly a radially compressive force, on the scintillator material 107 at the axially location 212. Notably, the compressive member 204 may be axially spaced apart from the compressive member 203 along the length (Lc) of the scintillator material 107 and the length (Ld) of the detector housing via an axial distance 215.

As illustrated, the compressive member 204 can be at a compressed state (i.e., having an elliptical cross-sectional shape as illustrated as compared to a circular cross-sectional shape when in an uncompressed state) between the inner surface 221 of the detector housing and the scintillator material 107 when the detector assembly 105 is fully assembled and the detector housing 113 is closed. Provision of the compressive member in a compressed state when the detector housing 113 is closed, places the compressive member in an energized state and in direct contact with the detector housing 113 and the reflector 109, such that it is prepared to absorb shocks to the detector housing 113.

As further illustrated in FIG. 2A, the detector 105 can include a compressive member 205 extending around the entire peripheral side surface 110 of the scintillator material 107 between the detector housing and the scintillator material 107. As further illustrated, the compressive member 205 occupies an axial position 213 within the detector housing 113 and is axially spaced apart from the compressive member 204 by an axial distance 216. The compressive member 205 can be an annular-shaped member. The compressive member 205 can be configured to exert a compressive force on the scintillator material 107, when the scintillator material 107 is disposed within the closed detector housing 113 as illustrated.

The detector 105 can include a plurality of compressive members 203, 204, and 205, which can be axially spaced apart from each other along the length (Lc) of the scintillator material 107. As illustrated in FIG. 2A, the compressive member 203 can be disposed at a position 211 that is closer to the distal end 201 of the detector housing 113 than the compressive member 204 and compressive member 205. The compressive member 205 can be disposed at an end of the scintillator material 107 adjacent to the proximal end 202 of the detector housing 113, such that it is closer to the window 115 than compressive member 204 and compressive member 203. The compressive member 204 can be disposed at an axial position 212 within the detector housing 113 such that it is proximate to, or even overlying, a midpoint 260 of the scintillator material 107 and closer to the midpoint 260 of the scintillator material 107 than the compressive member 203 or compressive member 205. As will be appreciated, the midpoint 260 is a position in the center of the scintillator material 107 that bisects the length (Lc) of the scintillator material 107.

In certain embodiments, the compressive member 203 can be configured to exert a certain compressive force on the scintillator material 107. Likewise, the compressive member 204 can be configured to exert a particular compressive force on the scintillator material 107. In particular instances, the compressive forces exerted by the compressive members 203 and 204 can be the same relative to one another. However, in other instances, the compressive forces exerted by the compressive members 203 and 204 may be different as compared to each other. In fact, in certain instances, the compressive member 204 can exert a greater compressive force on the scintillator material 107 at the axial position 212 overlying the midpoint 260 as compared to the compressive force exerted by compressive member 203 at the axial position 211.

Certain differences between the compressive members 203, 204, and 205 can be used to exert different degrees of compressive force on the scintillator material 207 at different axial positions along the length of the scintillator material 207. It may be suitable to exert different compressive forces on certain crystalline scintillator materials at different axial positions to avoid damage to the crystalline material. Some scintillator materials, particularly crystalline materials, may exhibit particular fracture mechanisms (e.g., more likely to fracture about the midpoint 260), and it may be preferable to place such regions of the scintillator material under greater compressive forces than other regions of the crystal (e.g., the ends) to reduce the probability of fracture in said regions. For example, in certain instances, the compressive member 203 can be formed of a less rigid material (e.g. less elastic material) than the material used in the compressive member 204, and thus exert less compressive force.

In other instances, the compressive member 204 may be formed of a greater amount of material, such that the thickness of the member is greater than another compressive member. For example, as illustrated, the compressive member 204 can have a greater thickness as compared to compressive members 203 and 205, and thus the compressive member 204 can exert a greater compressive force on the scintillator material 107 as compared to the compressive members 203 and 205.

In still other instances, one compressive member may have different dimensions, such as width as measured along the longitudinal axis 180 in FIG. 2A. for example, when the detector housing 113 is in a closed position, the compressive member 204 can be compressed to a greater degree between the housing 113 and the scintillator material 107 than the compressive members 203 and 204. Such a difference in dimension may allow the compressive member 204 to exert a greater compressive force on the scintillator material 107 than compressive members 203 and 205.

It will be appreciated that a combination of all such factors may be used to facilitate differences in compressive forces exerted by the compressive members 203-205 at different axial positions along the length of the scintillator material 107. Moreover, it will be appreciated that while three compressive members 203, 204, and 205 are illustrated, any of the embodiments herein can incorporate a greater or lesser number of compressive members to achieve suitable stabilization of the scintillator material within the detector housing 113.

Figure 3:
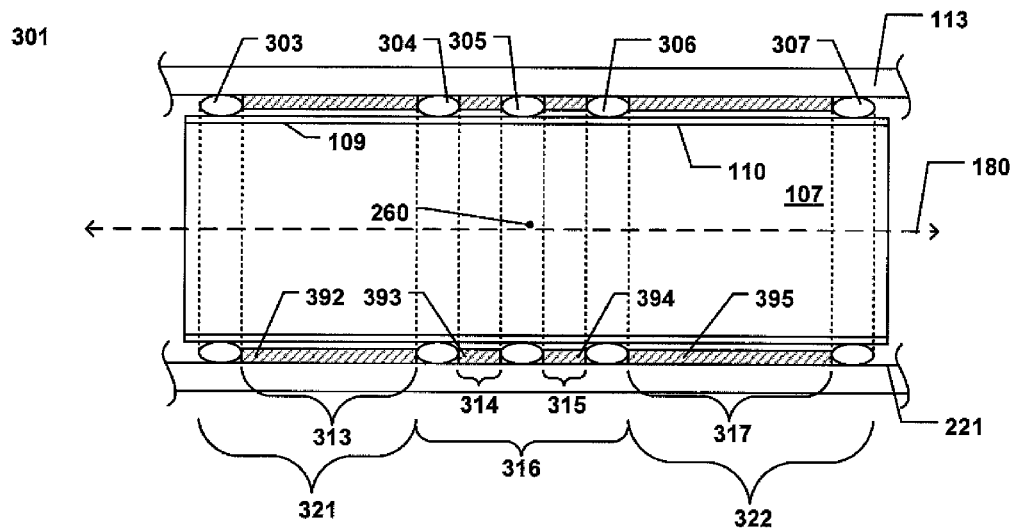
FIG. 3 includes a cross-sectional illustration of a portion of a detector in accordance with an embodiment.

FIG. 3 includes a cross-sectional illustration of a portion of a detector in accordance with an embodiment. As illustrated in FIG. 3, a scintillator material 107 is disposed within a casing, which in the illustrated embodiment is a detector housing 113. Additionally, the detector 301 can include a reflector 109 disposed along the peripheral side surface 110 of the scintillator material 107. Furthermore, the detector 301 can include compressive members 303, 304, 305, 306, and 307 (303-307) disposed around the peripheral side surface 110 of the scintillator material 107. Each of the compressive members 303-307 can exert a compressive force on the scintillator material 107 at the respective axial locations. Each of the compressive members 303-307 can overlie an axial position along the peripheral side surface 110 of the scintillator material 107 that extends a fraction of the total length (Lc) of the scintillator material 107 as measured along the longitudinal axis 180. As further illustrated, each of the compressive members 303-307 can be axially displaced from each other along the length of the scintillator material 107.

In particular, the axial spacing as measured along the longitudinal axis 180 between each of the compressive members 303-307 may be different. Notably, the axial distance 313 between the compressive member 303 and compressive member 304 is different as compared to the axial distance 314 between the compressive member 304 and compressive member 305. Moreover, the compressive members 303-307 can be arranged such that compressive members 304-306, which occupy positions closer to the midpoint 260 of the scintillator material 107 than the compressive members 303 and 307, are more closely spaced to each other. That is, the axial distance 314 and 315 between the compressive members 304-306 is less than the axial spacing 313 and 317.

As such, it will be appreciated that the spacing between compressive members 303-307 may be different such that the compressive force exerted on the scintillator material 107 at different axial regions along the length (Lc) of the scintillator material 107 can be controlled. For example, the arrangement of compressive members 303-307 is such that the total compressive force exerted on the scintillator material 107 within the region 316 (occupied by compressive members 304-306) is greater than the total compressive force exerted by the compressive member 303 over the region 321. Likewise, the compressive force exerted by the compressive members 304-306 within the region 316 can be greater than the compressive force exerted by the compressive member 307 over the region 322.

As further illustrated in FIG. 3, the detector 301 can be formed such that a spacer 392 is disposed between the compressive member 303 and compressive member 304. Likewise, spacer 393, spacer 394, and spacer 395 can occupy the axial gaps between the compressive members 304, 305, 306, and 307, respectively. The spacers 392-395 can extend circumferentially around the entire inner surface 221 of the detector housing 113.

The spacers 392-395 can aid fixing of the axial positions of each of the compressive members 303-307 relative to the scintillator material 107. That is, during assembly, the spacers 392-395 may be placed within the detector housing 113, and more particularly attached (e.g., bonded, fastened, adhered, etc.) to the inner surface 221 of the detector housing 113, such that the compressive members 303-307 can be placed in their respective positions between the spacers 392-395. After placing the compressive members 303-307 in their respective axial positions defined by the radial openings defined between the spacers 392-395, the scintillator material 107 can be placed within the detector housing 113.

As illustrated, the spacers 392-395 can be disposed within the detector housing such that there are abutting compressive members on either sides. That is, for example, the spacer 392 can abut compressive members 303 and 304. Notably, the spacers 392-395 may have a thickness, as measured in a direction perpendicular to the longitudinal axis 180 that does not exceed the height (or circumference), as measured in the same direction, of the compressive members 303-307 in the compressed state. As illustrated in FIG. 2A, direct contact with the compressive members 303-307 and the inner surface 221 of the detector housing 113 and the reflector 109 (or scintillator material 107) is facilitated.

It will be appreciated, that each of the spacers 392-395 can be made of the same material. However, in other instances it may be suitable that certain spacers 392-395 are made of different materials from each other. For example, spacer 393 and 394 may be formed of a less rigid, or alternatively, a more rigid material than spacers 392 and 395.

Moreover, the spacers 392-395 can be made of the same material or a different material as the compressive members 303-307. In certain instances, the spacers 392-395 can be made of inorganic material. In particular embodiments, the organic material can be a low-outgassing polymer material, such as a silicone.

In certain instances, it is suitable that the spacers 392-395 can include an active component. An active component can include one or more components that aid in the sensing capabilities of the detector. For example, in one embodiment, one or more spacers 392-395 can include a calibration component, which can include a radiation emitting component that facilitates calibration of the scintillation material 107 over a range of temperatures. Particular examples include a light-emitting diode (LED) or a radiation source.

Alternatively, one or more of the spacers 392-395 may include a radiation-sensitive material that may augment the radiation-sensitive capabilities of the scintillator material 107. For example, suitable radiation-sensitive components can include materials capable of detecting and/or interacting with the presence of certain types of radiation. In some cases, the type of radiation being sensed by the radiation-sensitive component can be the same type of radiation capable of being detected by the scintillation material 107. However, in other embodiments, the radiation-sensitive component can detect a type of radiation that is different than the type of radiation capable of being detected by the scintillator material 107. For example, the radiation-sensitive components may be able to detect and/or interact with radiation including gamma rays, neutrons, alpha particles, beta particles, and a combination thereof.

Figure 4:
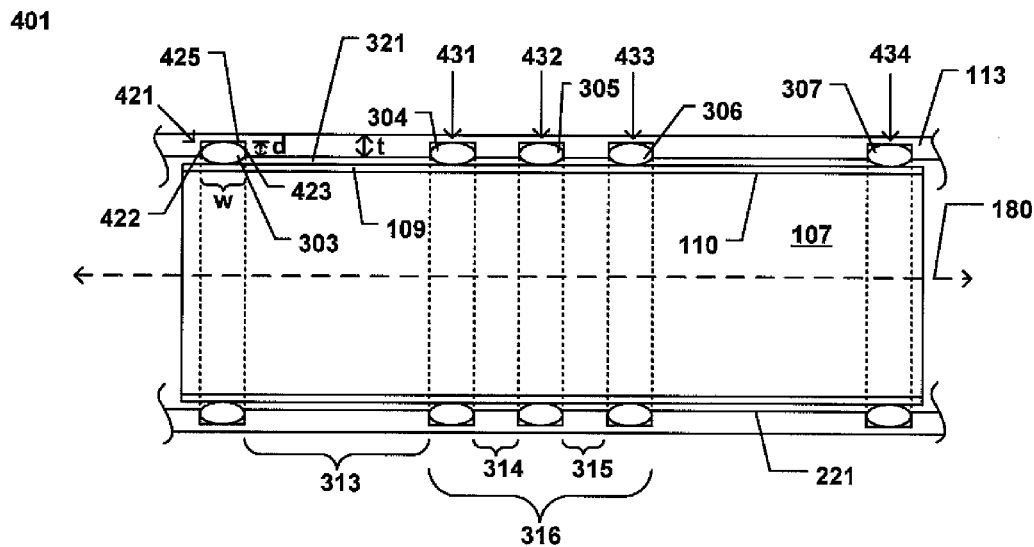
FIG. 4 includes a cross-sectional illustration of a portion of a detector in accordance with an embodiment.

FIG. 4 includes a cross-sectional illustration of a portion of a detector in accordance with an embodiment. As illustrated, the detector 401 can include a scintillator material 107 contained within a casing, which in the particular embodiment is a detector housing 113. The detector 401 includes compressive members 303, 304, 305, 306, and 307 (303-307) disposed within the detector housing 113. Each of the compressive members 303-307 can be annular-shaped members such that each of the compressive member 303-307 are located at a particular axial location along the length of the scintillator material 107. Moreover, each compressive member 303-307 can exert a compressive force around the entire peripheral side surface 110 of the scintillator material 107 at each of the respective axial locations.

In accordance with a particular embodiment, the compressive member 303 can be disposed within a recess 421. As illustrated in FIG. 4, the recess 421 can be formed within the body of the detector housing 113. The recess 421 can extend radially inward into the body (into the thickness (t)) of the detector housing 113 as illustrated in FIG. 4. The recess 421 can be in the form of a groove that extends circumferentially along the inner surface 221 of the detector housing 113. Such a design facilitates positioning of the compressive member 303 within the detector housing 113, and particularly, fixing the axial location of the compressive member 303 relative to the scintillator material 107.

In certain designs, the recess 421 can be a complementary engagement structure designed to have surfaces configured to abut surfaces of the compressive member 303, fixing the position of the compressive member 303 within the recess 421. As illustrated in FIG. 4, the recess 421 can be formed of surfaces 422 and 423, which extend substantially perpendicular to the longitudinal axis and are joined by the surface 425. The surfaces 422, 423, and 425 define a groove that has a size and shape configured to engage the compressive member 303 therein, and more particularly, can have a dimension designed to limit the amount of compression experienced by the compressive member 303.

For example, the width (w) of the recess 421, as measured along the longitudinal axis, and the depth (d) of the recess 421, as measured in a direction perpendicular to the longitudinal axis into the thickness (t) of the detector housing 113, can have particular dimensions, facilitating a particular amount of compression of the compressive member 303. In particular, the dimensions of the recess 421 (i.e., width and depth) can be selected to maintain a proper energized state of the compressive member 303 and maintain direct contact with surfaces of the recess 421 and the reflector 109, and thus the scintillator material 107 during use. Moreover, the recess 421 can be formed to have a depth (d) suitable to maintain a gap 321 between the reflector 109 and inner surface 221 of the detector housing 113 to maintain resilient biasing of the scintillator material 107 against the detector housing 113 via the compressive member 303, and further allow for expansion and contraction of material due to temperature changes.

As further illustrated in FIG. 4, each of the compressive members 303-307 may be contained within recesses (421, 431, 432, 433, and 434) that extend into the thickness (t) of the body of the detector housing 113. Each of the recesses 431-434 can have those characteristics described above with regard to the recess 421. Utilization of such recesses can facilitate initial positioning of the compressive members 303-307 within the recesses 421, 431, 432, 433, and 434 prior to full assembly such that a user can first place the compressive members 303-307 within respective recesses 421, 431, 432, 433, and 434, and thereafter, place the scintillator material 107 and reflector 109 within the opening of the detector housing to form the detector 401 as illustrated.

As further illustrated in FIG. 4, the spacing between the compressive members 303-307 can be similar to that as illustrated in FIG. 3, such that the axial distances 313, 314, and 315 between the compressive members 303-307 can be varied. Likewise, the recesses formed within the peripheral side surface 221 of the detector housing 113 can also be spaced at corresponding axial distances from each other to facilitate engagement of the compressive members 303-307 therein.

Figure 10:
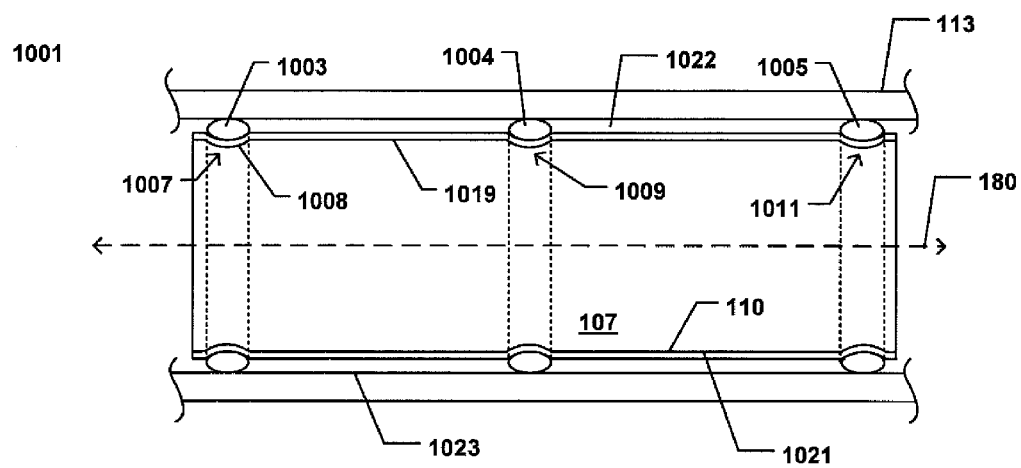
FIG. 10 includes a cross-sectional illustration of a portion of a detector in accordance with an embodiment.

Turning briefly to FIG. 10, a cross-sectional illustration of a portion of a detector is provided in accordance with an embodiment. Notably, the detector 1001 includes a scintillator material 107, a detector housing 113, and compressive members 1003, 1004, and 1005 disposed between the detector housing 113 and scintillator material 107. The compressive members 1003-1005 can be configured to exert a compressive force on the scintillator material 107 at the respective axial locations. As further illustrated, and in accordance with an embodiment, the scintillator material 107 can be formed such that it includes recesses 1007, 1009, and 1011 formed within the body of scintillator material 107 along the peripheral side surface 110 of the scintillator material 107. The recesses 1007-1011 can extend circumferentially around the peripheral side surface 110 of the scintillator material 107 and extend radially inward into the body of the scintillator material 107. The recesses 1007-1011 are configured to engage the compressive members 1003-1005 therein, and fix the axial position of the compressive members 1003-1005 relative to the scintillator material 107. FIG. 10 provides an alternative design for utilizing recesses to fix the axial position of compressive members 1003-1005 relative to the scintillator material 107.

The recess 1007 can be shaped to have a complementary contour to facilitate engagement of the compressive member 1003 therein. As illustrated in FIG. 10, the recesses 1007, 1009, and 1011 within the scintillator material 107 can have a generally curved cross-sectional contour to facilitate seating of the compressive members 1003-1005. Notably, the dimensions of the recesses 1007, 1009 and 1011 (i.e., width and depth) can be selected to maintain engagement of the compressive members 1003-1005, and more particularly, maintain a particular energized state (i.e., compressive force) of the compressive members 1003-1005. Moreover, the recesses 1007, 1009, and 1011 can be formed to have a depth suitable to maintain a gap 1022 between the reflector 109 and inner surface 1023 of the detector housing 113, which can facilitate resilient biasing of the scintillator material 107 against the detector housing 113.

As further illustrated in FIG. 10, a reflector 1019, as described in other embodiments, can overlie the side surface 1021 of the scintillator material 107. Notably, the reflector 1019 can also extend into the recesses 1007, 1009, and 1011, and more particularly, may be contoured along the shape of the recesses 1007, 1009, and 1011 between the scintillator material 107 and the compressive members 1003-1005.

Figure 5:
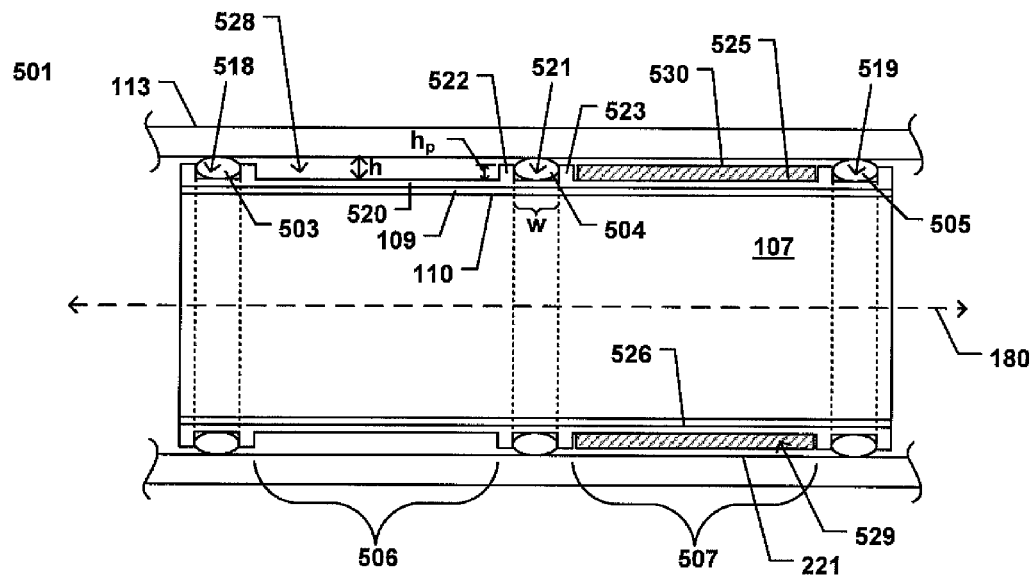
FIG. 5 includes a cross-sectional illustration of a portion of a detector in accordance with an embodiment.

FIG. 5 includes a cross-sectional illustration of a portion of a detector in accordance with an embodiment. In particular, the detector 501 includes a scintillator material 107 disposed within a casing, which is a detector housing 113, and compressive members 503, 504, and 505 disposed between the detector housing 113 and the scintillator material 107. The compressive members 503-505 can be annular-shaped members, extending around the peripheral side surface 110 of the scintillator material 107 and configured to exert a compressive force on the scintillator material 107 at the particular axial locations where the compressive members 503-505 are positioned.

The detector 501 can include a sleeve 520 that can extend axially along the length of the scintillator material 107 in the direction of the longitudinal axis 180 and further extend circumferentially around the peripheral side surface 110 of the scintillator material 107. The sleeve 520 can overlie and envelop the peripheral side surface 110 of the scintillator material 107, such that the compressive member 504 is radially spaced apart from the reflector 109 and the scintillator material 107 by a portion of the body of the sleeve 520.

The sleeve 520 can be made of an inorganic material, an organic material, or a combination thereof. In certain instances, the sleeve 520 can be formed of an organic material, such as a polymer, particularly an elastomer. For example, the sleeve 520 can be formed of a material, particularly a pliable material suitable for absorbing shocks to the detector housing 113 and protecting the scintillator material 107 from shocks delivered to the detector housing 113.

In accordance with an embodiment, the sleeve 520 can be positioned such that is overlies and abuts the reflector 109 that overlies the peripheral side surface 110 of the scintillator material 107. More notably, the sleeve 520 can be formed such that it includes recesses 518, 519, and 521 configured to engage the compressive members 503, 504, and 505 therein. As illustrated in FIG. 5, the sleeve 520 can include a recess 521 formed in the outer surface 525 of the sleeve 520. The recess 521 can be a region disposed between two radial projections 542 and 543 extending from the outer side surface 525 of the sleeve 520 and configured to engage the compressive member 504 therein. The sleeve 520 can have an inner surface 526 that is substantially smooth, and may not necessarily include radial projections or curvatures, such that the inner surface 526 can directly engage the reflector 109, particularly along the entire length of the reflector 109 along the length of the scintillator material 107.

The recesses 518, 519, and 521 can be utilized for axial positioning of the compressive members 503-505 relative to the scintillator material 107. Therefore, during assembly, a subassembly of the scintillator material 107, reflector 109, sleeve 520, and the compressive members 503-505 can be formed. Upon proper formation of the subassembly, the components of the subassembly can be placed within the detector housing 113, wherein the compressive members 503-505 are compressed and placed in an energized state ready to absorb shocks to the detector housing 113.

Notably, the recess 521 can have particular dimensions, including for example, the width (w) and height ($h_p$), suitable for maintaining the compressive member 504 at the desired axial location while maintaining a proper compressive state of the compressive member 504, such that direct contact between the inner surface 221 of the detector housing 113 and the sleeve 520 is maintained. In particular, the radial projections 522 and 523 can have a height ($h_p$) as measured in a radial direction perpendicular to the longitudinal axis 180 that is suitable for maintaining the compressive member 504 within the recess 521.

As further illustrated, the sleeve 520 can be formed such that axial gaps 528 and 529 exist between the recesses 518, 521, and 519. As further illustrated, the gaps 528 and 529 can have a height (h) as measured between the outer surface 525 of the sleeve 520 and the inner surface 221 of the detector housing 113 in a direction perpendicular to the longitudinal axis 180. Notably, the radial projections 522 and 523 of the sleeve 520 are formed to have a height ($h_p$) that is less than the height (h) of the gaps 528 and 529 to assure proper contact between the detector housing 113 and the compressive members 503-505.

Moreover, it will be appreciated that while the detector 501 is illustrated as having a sleeve with recesses 518, 521, and 519, which are axially spaced apart from each other at particular axial distances 506 and 507, alternative spacing arrangements between the recesses 518, 511, and 519 may be utilized. Moreover, the sleeve 521 may be formed to have a greater number, or lesser number of recesses and compressive members.

Furthermore, the detector 501 can be formed such that a spacer 530 can be placed within one or more of the axial gaps, such as in the gap 529. As will be appreciated, the spacer 530 can have the same characteristics as the spacers described in accordance with the embodiment of FIG. 3.

While not illustrated the sleeve 520 can include further features, including for example, protrusions extending radially inward from an inner peripheral surface of the sleeve 520 and configured to engage the scintillator material, or any object around which the sleeve 520 is placed. The protrusions can be in the form of ribs, or other features that may increase the surface area of the surface of the sleeve. Alternatively, the sleeve 520 can include protrusions extending radially outward from an outer peripheral surface of the sleeve 520 and configured to engage a surface of an object in which the sleeve is disposed (e.g., casing, etc.).

Figure 6:
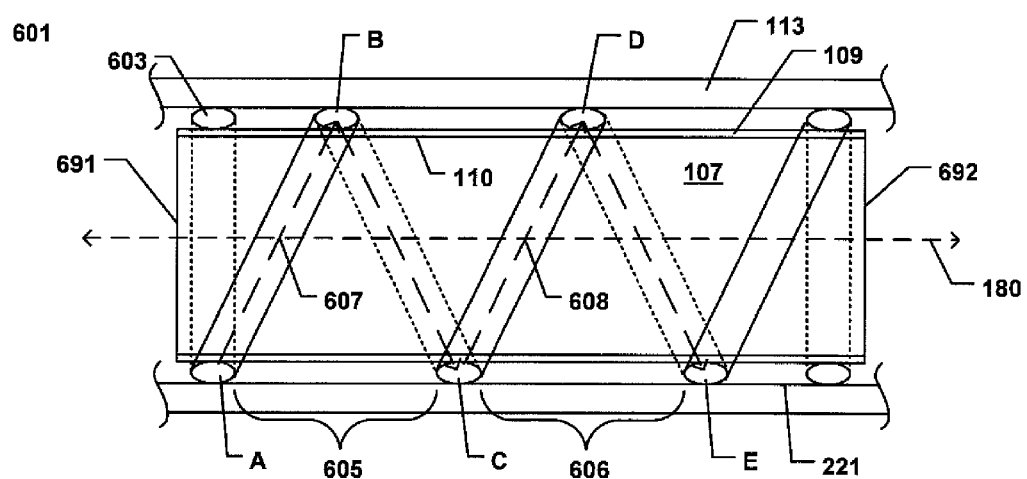
FIG. 6 includes a cross-sectional illustration of a portion of a detector in accordance with an embodiment.

FIG. 6 includes a cross-sectional illustration of a portion of a detector in accordance with an embodiment. As illustrated, the detector 601 can include a scintillator material 107 disposed within a casing, which is a detector housing 113, and a compressive member 603 disposed between the detector housing 113 and scintillator material 107. Moreover, the compressive member 603 can exert a compressive force, particularly a radially compressive force, on the scintillator material 107 at the particular axial location of the compressive member 603. Furthermore, the compressive member 603 can be configured to be a pliable material, which can be compressed between the scintillator material 107 and the detector housing, such that it is in an energized state and configured to limit shocks delivered to the detector housing 113 being transferred to the scintillator material 107.

In accordance with an embodiment, the compressive member 603 can be a helically-shaped body. As illustrated, the compressive member 603 can have a helically-shaped body that extends circumferentially around the peripheral side surface 110 of the scintillator material 107 and also extends axially along a length of the scintillator material 107 in the direction of the longitudinal axis 180. That is, the compressive member 603 can travel circumferentially and axially around the scintillator material 107 in a screw-type path defined by a plurality of turns, which are connected to each other. As will be appreciated, the detector 601 can utilize a single compressive member 603 along the length of the scintillator material 107 that extends from a first end 691 of the scintillator material 107 to a second end 692, opposite the first end 691 of the scintillator material 107. The compressive member 603 can have a helically-shaped body formed of a plurality of turns that are connected to each other, wherein each turn completes 360° of rotation around the scintillator material 107 between a start position and a stop position. Moreover, upon completion of a single turn, the starting and stopping positions are axially displaced from each other along the longitudinal axis 180.

For example, the compressive member 603 includes a turn 607 starting at position A, moving through position B, and again traveling around the peripheral side surface 110 of the scintillator material 107 to position C. As illustrated in FIG. 6, position A and position C are axially displaced from each other by an axial distance 605. As further illustrated, the compressive member 603 can include a plurality of turns, including turn 608, which is initiated at position C, moving through position D, and finishing at position E, which defines 360 degrees of rotation circumferentially around the scintillator material 107.

Figure 7:
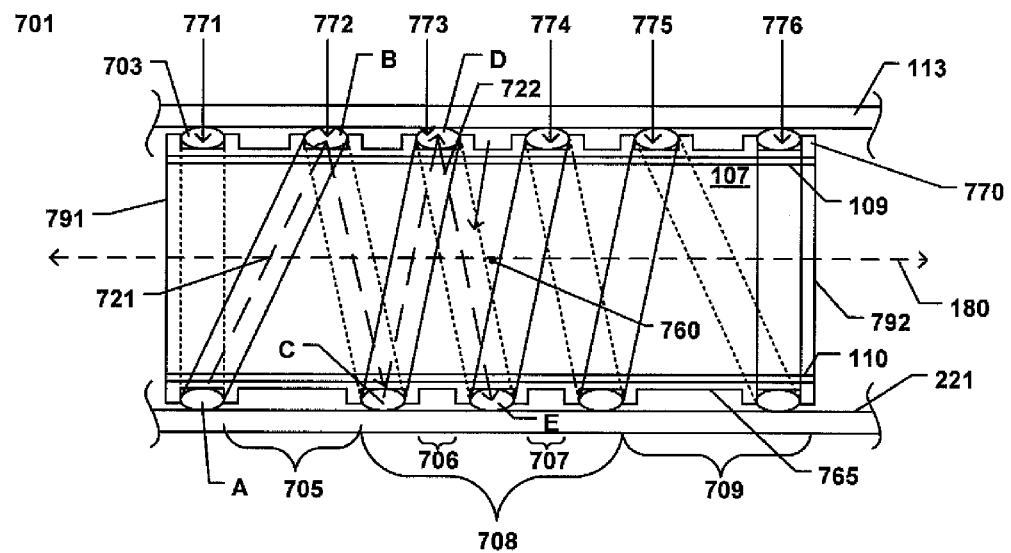
FIG. 7 includes a cross-sectional illustration of a portion of a detector in accordance with an embodiment.

FIG. 7 includes a cross-sectional illustration of a portion of a detector in accordance with an embodiment. As illustrated, the detector 701 can include a scintillator material 107 disposed within the interior of a casing, which in the particular embodiment, is a detector housing 113. Furthermore, the detector 701 can include a compressive member 703 disposed between the detector housing 113 and the scintillator material 107. As illustrated, the compressive member 703 can have a helically-shaped body including a plurality of turns connected to each other and extending circumferentially around the peripheral side surface 110 of the scintillator material 107. The compressive member 703 can also extend axially, with each turn, along the length of the scintillator material 107. The detector 701 may utilize a single compressive member 703 extending from a first end 791 of the scintillator material 107 to a second end 792 of the scintillator material 107.

However, in other embodiments, more than one compressive member having a helically-shaped body can be utilized. It will be appreciated, that the helical compressive member does not necessarily need to extend for the full length of the scintillator material 107, and furthermore, that more than one helical compressive member can extend for different lengths along the longitudinal axis 180. Additionally, various helically-shaped compressive members can be used within the detector housing to exert different compressive forces on the scintillator material 107 at different axial regions along the length of the scintillator material 107.

Use of compressive members having helically-shaped bodies can facilitate uniform distribution of compressive forces across the length of the scintillator material 107, as opposed to utilization of one or two annular-shaped compressive members which exert compressive forces at particular axial locations. Still, it will be appreciated that certain detectors or tools can utilize a combination of annular-shaped compressive members and helically-shaped compressive members.

As further illustrated, the compressive member 703 can be formed such that it has a helically-shaped body including a plurality of turns, yet the turns may define different axial distances relative to one another, and therefore, define a different pitch of the compressive member 703. For example, as illustrated, the compressive member 703 can be formed such that a first turn 721 travels from position A, through position B, and around to position C, wherein the axial displacement between position A and position C is illustrated as a distance 705. Additionally, the compressive member 703 can include a turn 722 initiated at position C, extending through position D, and stopping at position E, wherein the axial displacement between position C and position E is a distance 706. As illustrated, the distance 705 can be different than the distance 706, and thus the pitch of the turn 721 can be different than the pitch of the turn 722.

In certain embodiments, the compressive member 703 can be a helically-shaped body that includes a plurality of turns, wherein at least two turns have a different pitch as compared to each other. The difference in pitch between turns can be configured to exert a different compressive force over different axial regions of the scintillator material 107 over which the turns travel. That is, the change in pitch as measured by the difference in axial distance 706 and 705 between turn 722 and turn 721, respectively may facilitate different compressive forces exerted on the scintillator material 107 by the compressive member 703 at various axial locations along the length of the scintillator material 107. As illustrated, the pitch of the compressive member 703 within the region 708 is different (e.g., less) than the pitch of the compressive member 703 closer to the ends 791 and 792 of the scintillator material 107 in regions 705 and 709. In certain instances, it may be suitable that a greater compressive force is exerted around the midpoint 760 of the scintillator material 107 within the region 708 as opposed to the ends 791 and 792 of the scintillator material 107 within regions 705 and 709. Accordingly, a construction of the compressive member 703 as illustrated in FIG. 7 can facilitate such a variation in compressive forces exerted by altering the pitch of the helically-shaped compressive member 703.

As further illustrated, the detector 701 can be formed to include a sleeve 770 that extends axially along the length of the scintillator material 107 and further extends circumferentially around the peripheral side surface 110 of the scintillator material 107. The sleeve 770 can be formed to include a plurality of recesses 771, 772, 773, 774, 775, and 776 (771-776) configured to engage the compressive member 703 therein. The recesses 771-776 can be positioned such that they are complementary to the path of the compressive member 703. That is, the sleeve 770 can be formed such that the recesses 771-776 extend in a helically-shaped pattern along the outer surface 765 of the sleeve 770 is configured to guide the path of the compressive member 703. Notably, the outer surface 765 of the sleeve 770 can be formed to have helically-shaped path of recesses, which are all connected, and therefore may be considered a single recess extending in a helical path, wherein the pitch of the path is altered to facilitate changes in pitch of the turns of the compressive member 703 disposed in the recesses 771-776. For example, the axial spacing between certain of the recesses 771-776 of the sleeve 770 can be formed to facilitate change in pitch of the compressive member 703.

While FIG. 7 illustrated recesses 771-776 formed in a sleeve 770 overlying the scintillator material 107, in an alternative embodiment, the inner surface of the detector housing 113 can be formed to have recesses configured to engage the compressive member 703 therein (see, for example, FIG. 4). In such an embodiment, a sleeve may not necessarily be incorporated within the detector housing 113. In particular, the detector housing 113 can be formed to have a single, helically-shaped path, in the form of a groove, extending along the inner surface 221 of the detector housing and configured to engage a helically-shaped compressive member therein. The helically-shaped recess within the inner surface 221 of the detector housing 113 can be formed to guide the path of the compressive member engaged therein, and thus, may be formed to have changes in pitch between turns, like the sleeve illustrated in FIG. 7.

In accordance with an alternative embodiment, the scintillator material 107 can be formed to have recesses formed in the peripheral side surface 110 to engage a compressive member therein, such as illustrated in FIG. 10. Notably, the scintillator material 107 can be formed to have a helically-shaped recess that extends circumferentially and axially along the peripheral side surface 110 of the scintillator material 107. Like previous embodiments herein, the recess formed in the peripheral side surface 110 of the scintillator material 107 can be formed to guide the path of the compressive member engaged therein, and thus, may be formed to have changes in pitch between turns.

Figure 8:
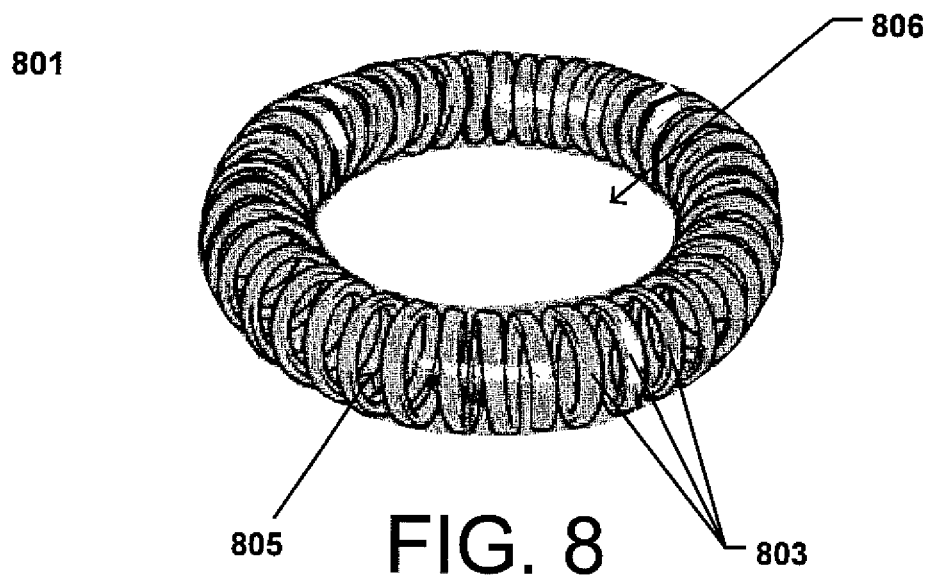
FIG. 8 includes a perspective view illustration of a compressive member in accordance with an embodiment.
Figure 9:
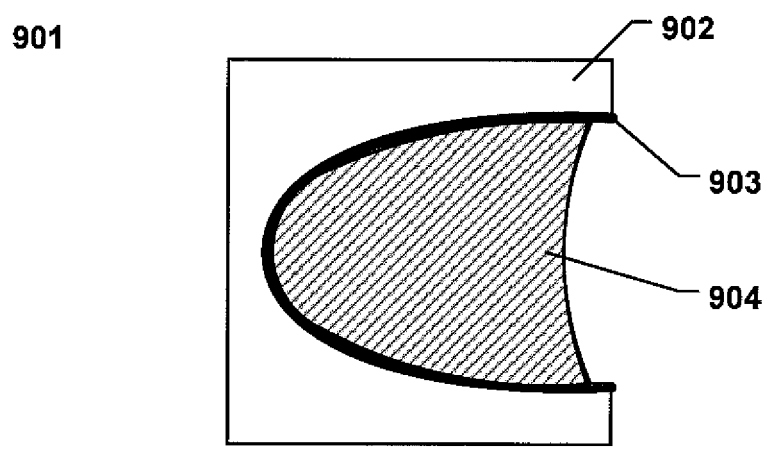
FIG. 9 includes a cross-sectional illustration of a compressive member in accordance with an embodiment.

Referring now to particular constructions of the compressive members that can be used in the embodiments herein, FIGS. 8 and 9 include illustrations of certain compressive members. FIG. 8 includes a perspective view illustration of a compressive member in accordance with an embodiment. As illustrated, the compressive member 801 can be an annular-shaped body defining a central opening 806 therein. Notably, the compressive member 801 can have a coiled construction including a material that is formed into a plurality of loops 803, wherein each of the loops are connected to each other to form a spiral of material. The coiled construction can connect to itself such that it forms a body having an annular shape. As such, the coiled construction includes a plurality of loops 803, wherein an inner annular recess 805 is defined within the body of the compressive member 801, within the interior space defined by the loops 803. While it is not illustrated, it will be appreciated that the coiled construction of the compressive member 801 is not limited to an annular-shaped construction as illustrated, and can take other forms, such as a helically-shaped body.

The compressive member 801 (and all compressive members herein independent of shape) can be formed of an inorganic material, an organic material, or a combination thereof. For example, in certain instances the compressive member 801 can be formed of a metal or metal alloy material. Suitable metal materials may include transition metal elements, including for example, iron, chromium, molybdenum, cobalt, nickel, copper, silver, palladium, titanium, vanadium, zinc, magnesium, zirconium, aluminum, tungsten, beryllium, and a combination thereof. In particular instances, the compressive member 801 can be formed of steel, titanium, titanium alloy, aluminum, aluminum alloy, nickel-based alloys (e.g., Hastelloy® and Inconel®) and a combination thereof.

Certain suitable organic materials can include polymers. Some suitable polymers include elastomers. For example, in one embodiment, the polymer material can include a halide material, such as fluorine, such that the polymer can be a fluoropolymer.

In accordance with one particular embodiment, the compressive member 801 may be in the form of an Omni-Spring™ or Omni-Shield™ available from Saint-Gobain Performance Plastics, Inc.

While not illustrated, in certain instances the compressive member 801 may be formed such that the inner annular recess 805 can include an additional material to aid the resiliency of the compressive member 801. For example, the inner annular recess 805 may be filled with a filler material different from the material forming the loops 803 of the compressive member 801. Certain suitable filler materials may include organic materials, such as polymers, and more particularly an elastomer material. For example, the inner annular recess 805 may be filled with a low-outgassing silicone material.

FIG. 9 includes a cross-sectional illustration of a portion of a compressive member in accordance with an embodiment. As illustrated, the compressive member 901 can include a resilient portion 903, which may be in the form of a U-shaped construction, as viewed in cross-section, through the body of the compressive member. In certain instances, the resilient member 903 can be formed of an inorganic material, such as a metal or metal alloy.

A pliable material 902 may be attached (e.g., bonded, fastened, etc.) to the resilient material 903 to facilitate compressibility of the compressive member 901. Certain suitable materials for the compressible material 902 may include an organic material, such as a polymer. Moreover, the compressive material 901 may optionally include a filler material 904 disposed within the interior of the body of the compressive member 901 within the channel defined by the resilient member 903. The optional material 904 may be an organic material, such as a polymer, and more particularly an elastomer. For example, the optional material 904 can be a low-outgassing silicone material.

Figure 11:
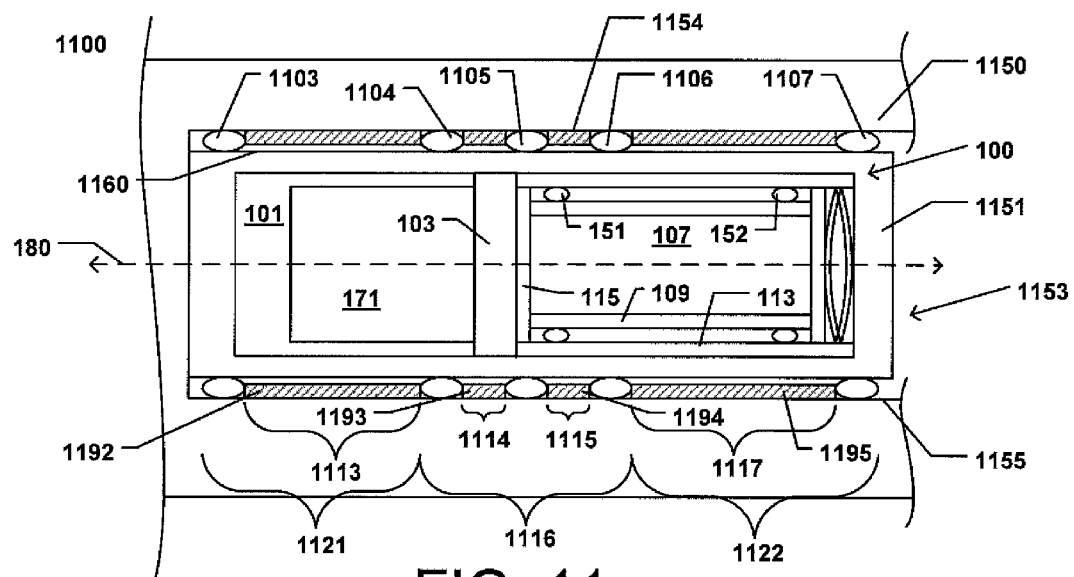
FIG. 11 includes a cross-sectional illustration of a portion of a tool including a detector contained within a casing in accordance with an embodiment.

FIG. 11 includes a cross-sectional illustration of a portion of a tool including a casing having a radiation detector contained therein in accordance with an embodiment. As illustrated in FIG. 11, the tool 1100 includes an opening 1153 defined by interior walls 1154 and 1155 extending into the tool body 1150 and defining a tool cavity. The tool 1100 can be part of a well boring apparatus, such as a drill bit or drill string, suitable for use in well drilling or well logging applications. The casing 1151 can be disposed within the opening 1153 and seated within the tool cavity. As noted herein, in certain instances, the casing 1151 can include other structures beyond the detector housing 113. As provided in the illustrated embodiment of FIG. 11, the casing is an outer housing 1151. The outer housing 1151 can contain the radiation detector 100 (See, FIG. 1 for components) including the detector assembly 105, a light pipe 103, and the photosensor housing 101. Each of the elements described herein with regards to the embodiments illustrated in FIGS. 2A-10 can be incorporated for use outside of the detector housing 113 and used with the outer housing 1151 within the opening 1153 of the tool body 1150.

The tool 1100 can include compressive members 1103, 1104, 1105, 1106, and 1107 (1103-1107) disposed around the exterior side surface 1160 of the outer housing 1151. In certain instances, the compressive members 1103-1107 directly contact the internal surfaces 1154 and 1155 of the opening 1153 and the exterior side surface 1160 of the outer housing 1151. Each of the compressive members 1103-1107 can exert a compressive force on the outer housing 1151 at the respective axial locations along the length of the outer housing 1151. Each of the compressive members 1103-1107 can overlie an axial position along the exterior side surface 1160 of the outer housing 1151 that extends for a fraction of the total length of the outer housing 1151 as measured along the longitudinal axis 180. As further illustrated, each of the compressive members 1103-1107 can be axially spaced apart from each other along the length of the outer housing 1151.

Various configurations of the compressive members 1103-1107 are available as described in previous embodiments. For example, certain designs may opt to use different axial spacing (as measured along the longitudinal axis 180) between compressive members 1103-1107. Notably, the axial distance 1113 between the compressive member 1103 and compressive member 1104 can be different as compared to the axial distance 1114 between the compressive member 1104 and compressive member 1105.

Moreover, the compressive members 1103-1107 can be arranged such that compressive members 1104-1106, which occupy positions closer to the axial midpoint of the outer housing 1151 than the compressive members 1103 and 1107, are more closely spaced to each other. That is, the axial distance 1114 and 1115 between the compressive members 1104-1106 can be less than the axial spacing 1113 and 1117. Moreover, the compressive force exerted on the outer housing 1151 at particular axial regions along the length of the outer housing 1151 can be different from the compressive force exerted on the outer housing 1151 in other axial regions. Additionally, the compressive members 1103-1107 can have any other features described in embodiments herein. For example, certain select compressive members 1103-1107 may have a different thickness as compared to other compressive members 1103-1107 (e.g., see, FIG. 2A).

In accordance with other embodiments, the tool 1100 can include a casing assembly that includes features of compressive members described in any of the other embodiments herein. For example, different compressive members can be used that exert different compressive forces at different axial locations along the length of the outer housing 1151. The compressive members can have various shapes, including for example, helically-shaped bodies, coiled constructions, and the like.

The tool 1100 may also incorporate a casing assembly that utilizes spacers 1192, 1193, 1194, and 1195 (1192-1195) disposed between the compressive members 1103-1107. The spacers 1192-1195 can extend circumferentially around the interior walls 1154 and 1155 of the outer housing 1151. The spacers 1192-1195 can facilitate fixing the axial positions of each of the compressive members 1103-1107 relative to the outer housing 1151. Each of the spacers 1192-1195 can abut at least one of the compressive members 1103-1107, and more particularly, certain spacers 1192-1195 can abut more than one compressive member 1103-1105. The spacers 1192-1195 can be made of the same material. The spacers 1192-1195 can have any and all features of other spacers described in embodiments herein.

Alternatively, additional elements may be used in the tool 1100. For example, the casing assembly including the outer housing 1151 contained within the opening 1153 may utilize a sleeve that can extend axially along the length of the exterior side surface 1160 of the outer housing 1151 in the direction of the longitudinal axis 180. The sleeve may further extend circumferentially around the exterior side surface 1160 of the outer housing 1151.

In another embodiment, the sleeve can overlie, and may be directly attached to, the interior walls 1154 and 1155 of the opening 1153. The sleeve may have recesses configured to contain compressive members therein. Notably, any sleeve utilized with the outer housing 1151 contained within the opening 1153 of the tool 1100 can have any of the features of other sleeves described herein. The sleeve can have any feature of any of the embodiments herein, including for example, the sleeve of FIG. 5.

Figure 12:
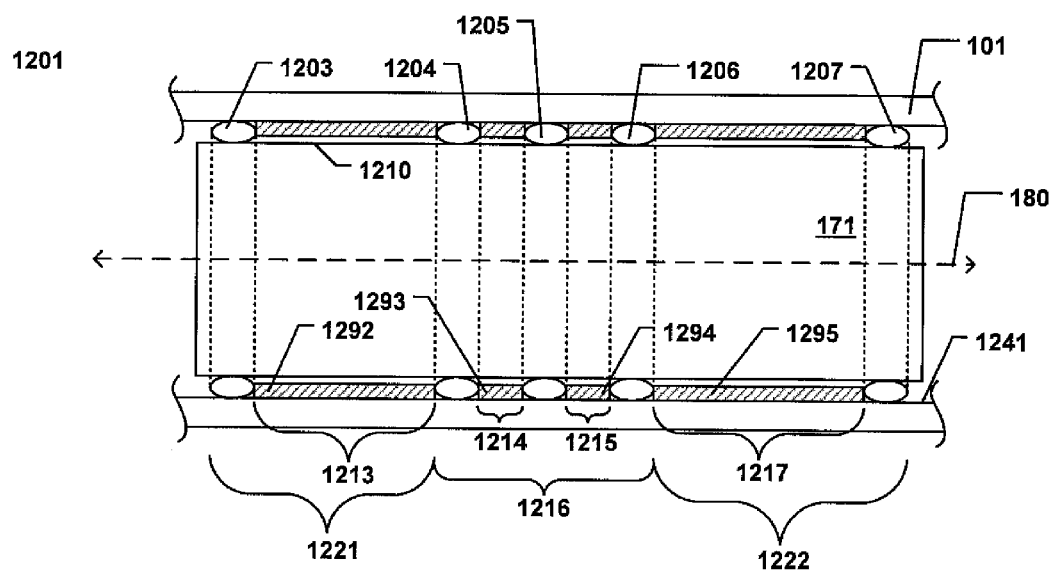
FIG. 12 includes a cross-sectional illustration of a portion of a detector in accordance with an embodiment.

Additionally, any of the features of the embodiments herein can be used in the context of a casing that is a photosensor housing. That is, any of the features of the embodiments herein can facilitate suspension and absorption of shocks of the photosensor within the photosensor housing. FIG. 12 includes a cross-sectional illustration of a portion of a detector in accordance with an embodiment. As illustrated in FIG. 12, a photosensor 171 and any associated structures, including for example signal processing electronics (which are not illustrated) can be disposed within a casing, which in the illustrated embodiment is a photosensor housing 101.

Like the embodiments described herein, the detector 1201 can include compressive members 1203, 1204, 1205, 1206, and 1207 (1203-1207) disposed around the peripheral side surface 1210 of the photosensor 171. Each of the compressive members 1203-1207 can exert a compressive force on the photosensor 171 at the respective axial locations along the length of the photosensor 171. Each of the compressive members 1203-1207 can overlie an axial position along the peripheral side surface 1210 of the photosensor 171 that extends a fraction of the total length (Lc) of the photosensor 171 as measured along the longitudinal axis 180. As further illustrated, each of the compressive members 1203-1207 can be axially displaced from each other along the length of the photosensor 171.

In particular, the axial spacing as measured along the longitudinal axis 180 between each of the compressive members 1203-1207 can be the same as the features described in the embodiments herein. For example, the axial distance 1214 and 1215 between the compressive members 1204-1206 is less than the axial spacing 1213 and 1217. As such, it will be appreciated that the spacing between compressive members may be different, such that the compressive force exerted on the photosensor 171 at different axial regions along the length (Lc) of the photosensor 171 can be different. For example, the arrangement of compressive members 1203-1207 is such that the total compressive force exerted on the photosensor 171 within the region 1216 (occupied by compressive members 1204-1206) is greater than the total compressive force exerted by the compressive member 1203 over the region 1221. Likewise, the compressive force exerted by the compressive members 1204-1206 within the region 1216 can be greater than the compressive force exerted by the compressive member 1207 over the region 1222.

As further illustrated in FIG. 12, the detector 1201 can include spacers 1292, 1293, 1294, and 1295 within axial gaps between the compressive members 1203, 1204, 1205, 1206, and 1207, respectively. The spacers 1292-1295 can extend circumferentially around the entire inner surface 1241 of the photosensor housing 101. As illustrated, the spacers 1292-1295 can be disposed within the photosensor housing 101 such that there are abutting compressive members on either sides.

It will be appreciated, that each of the spacers 1292-1295 can be made of the material described in other embodiments herein. Moreover, the compressive members 1203-1207 can include materials described in other embodiments herein.

While not illustrated in FIG. 12, the detector 1201 can include features described in embodiments herein. For example, the detector 1201 can include a sleeve like the sleeve 520 of FIG. 5. Alternatively, or additionally, the detector 1201 can be formed to have recesses within the interior surfaces, such as the recesses illustrated in FIG. 4.

Moreover, the detector 1201 can utilize other configurations of compressive members, including for example, a compressive member having a helically-shaped body as described in the embodiment of FIGS. 6 and 7.

The embodiments herein represent a departure from the state-of-the-art. Notably, the embodiments herein utilize detector devices that have a particular design features to limit damage to scintillator materials in industrial applications. Previous scintillator crystals have been packaged in ruggedized assemblies to protect them from shocks and vibrations, which have included unitary shock-absorbing sleeves, or series of axial springs extending along the length of a scintillator crystal. However, given the need for detectors capable of protecting the scintillator materials from harsher environments, including for example, potentially greater shocks than encountered previously and higher temperatures (>200° C.), it was discovered that the combination of features disclosed herein can be useful. Particularly, the radially-oriented compressive members can, among other things, facilitate isolation of certain axial regions of the scintillator material for compression, and application of differential compression along the length of the scintillator material, photosensor, and/or casing, depending on the configuration.

The radially compressive members may limit damage to the crystal based on mechanical shocks and thermal gradients, particularly gradients experienced during rapid cooling, which can cause significant tensile stresses within the crystal body. As such, the tools and radiation detectors of the embodiments herein include a combination of features, including particular scintillator materials, compressive members utilizing a combination of materials, configurations and arrangements of compressive members, shapes of compressive members, sleeves, recesses, and the like.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A tool comprising:
    a tool body having an opening defined by interior walls extending into the tool body;
    a casing disposed within the opening, wherein the casing is an outer housing;
    a detector housing disposed within the outer housing;
    a scintillator material disposed within the detector housing; and
    a first compressive member disposed within the tool body at a first axial location and a second compressive member disposed within the tool body at a second axial location, wherein:
        the first axial location extends for a fraction of a total axial length of the casing, and the first compressive member exerts a first radially compressive force at the first axial location, and
        the second axial location extends for a fraction of a total axial length of the casing, and the second compressive member exerts a second radially compressive force at the second axial location.

2. The tool of claim 1, wherein the first compressive member directly contacts the interior walls of the tool body.

3. The tool of claim 1, wherein the second compressive member directly contacts the interior walls of the tool body.

4. The tool of claim 1, wherein the first compressive member directly contacts exterior surfaces of the outer housing.

5. The tool of claim 1, wherein the first compressive member is spaced apart from the second compressive member.

6. The tool of claim 1, wherein the second compressive member directly contacts exterior surfaces of the outer housing.

7. The tool of claim 1, wherein the first compressive member is contained within the interior of the detector housing.

8. The tool of claim 1, wherein the first compressive member directly contacts interior surfaces of the detector housing.

9. A detector comprising:
a photosensor housing;
a photosensor disposed within the photosensor housing; and
a first compressive member disposed between the photosensor housing and the photosensor at a first axial location and a second compressive member disposed between the photosensor housing and the photosensor at a second axial location, wherein:
the first axial location extends for a fraction of a total axial length of the photosensor housing and a fraction of a total axial length of the photosensor, and the first compressive member exerts a first compressive force around an entire peripheral side surface of the photosensor at the first axial location, and
the second axial location extends for a fraction of a total axial length of the photosensor housing and a fraction of a total axial length of the photosensor, and the second compressive member exerts a second radially compressive force on the photosensor at the second axial location.

10. The detector of claim 9, wherein a spacer is disposed between the first compressive member and the second compressive member.

11. The detector of claim 9, wherein the second compressive member exerts a second compressive force around the entire peripheral surface of the photosensor at the second axial location.

12. The detector of claim 9, wherein the first compressive force is different than the second compressive force.

13. The detector of claim 9, wherein the first compressive member is disposed within a recess.

14. A detector comprising:
a detector housing;
a scintillator material disposed within the detector housing; and
a first compressive member disposed between the detector housing and the scintillator material at a first axial location and a second compressive member disposed between the detector housing and the scintillator material at a second axial location axially spaced apart from the first axial location, wherein:
the first axial location extends for a fraction of a total axial length of the detector housing and a fraction of a total axial length of the scintillator material, and the first compressive member exerts a first compressive force around a peripheral side surface of the scintillator material at the first axial location, and
the second axial location extends for a fraction of the total axial length of the detector housing and a fraction of the total axial length of the scintillator crystal.

15. The detector of claim 14, wherein the scintillator material has an elongated body having a longitudinal axis defining a length of the elongated body and intersecting a first end and a second end, the elongated body further including a lateral axis bisecting the length of the elongated body and intersecting the peripheral side surface extending between the first and second ends.

16. The detector of claim 15, wherein the elongated body is a cylindrical body having a length extending along the longitudinal axis between the first end and the second end, and a diameter extending along the lateral axis, wherein the length>diameter.

17. The detector of claim 14, wherein the scintillator material comprises CsF, NaI, $LaCl_3$, $LaBr_3$, BGO, $CaF_2$, LYSO, LSO, CsI, $LuI_3$, GSO, CLYC, CNLI, CLLB, LuAP, LuYAP, LuAG, LPS, $GdI_3$, $SrI_2$, LGSO, GYSO, LGYSO, or a combination thereof.

18. The detector of claim 14, wherein the second compressive member exerts a second compressive force around the entire peripheral surface of the scintillator material at the second axial location.

19. The detector of claim 18, wherein the first compressive force is greater than the second compressive force.

20. The detector of claim 14, wherein the first compressive member comprises a width, as measured through a cross-section of a body of the first compressive member, greater than a width of the second compressive member.

* * * * *